Nov. 18, 1969 T. F. SARAH 3,478,976
FLY REEL HAVING SELECTIVE AND ALTERNATE DRAG AND BRAKE MEANS
Filed Jan. 3, 1967 3 Sheets-Sheet 1

INVENTOR.
THOMAS F. SARAH
BY Hamilton & Cook
ATTORNEYS

Nov. 18, 1969  T. F. SARAH  3,478,976
FLY REEL HAVING SELECTIVE AND ALTERNATE DRAG AND BRAKE MEANS
Filed Jan. 3, 1967  3 Sheets-Sheet 2

INVENTOR.
THOMAS F. SARAH
BY Hamilton & Cook
ATTORNEYS

INVENTOR.
THOMAS F. SARAH
BY Hamilton & Cook
ATTORNEYS

United States Patent Office

3,478,976
Patented Nov. 18, 1969

3,478,976
FLY REEL HAVING SELECTIVE AND ALTERNATE DRAG AND BRAKE MEANS
Thomas F. Sarah, Akron, Ohio, assignor, by mesne assignments, to Shakespeare Company, Kalamazoo, Mich., a corporation of Delaware
Filed Jan. 3, 1967, Ser. No. 606,676
Int. Cl. A01k 89/02
U.S. Cl. 242—84.45      13 Claims

ABSTRACT OF THE DISCLOSURE

A fly reel frame provides a journal for a crank-operated shaft on which a spool is rotatably mounted and connected thereto by an adjustable friction drag. A pawl is pivoted on the frame and when engaged with a ratchet on the shaft, prevents unwinding rotation of the spool except against the slipping of the drag. A suitable friction brake is carried by the frame and biased toward engagement with the spool. A manual operator is also carried by the frame to selectively permit engagement of the pawl and ratchet and thereby the action of the drag or engagement of the friction brake with the spool.

Background of the invention

The present invention relates generally to fly reels, more particularly, the present invention relates to single action fly reels having an adjustable drag means. Specifically, the present invention relates to a fly reel having a selectively operative, variable drag means and an alternately operative brake means.

The purpose of the reel in fly fishing is simply to hold the spool on which the line is stored and to provide a means to wind and unwind the line from the spool. There are three basic types of fly reels: the automatic, single action and multiple action.

The automatic fly reel has a spring-operated spool which retrieves line automatically whenever you press a line retrieve lever. The single action fly reel is so named because the line spool makes one complete revolution for each turn of the handle. The multiple action reel provides more than one revolution of the spool for one turn of the handle and accordingly does retrieve line faster. However, fishing contests almost universally stipulate single action reels, and the present Invention is therefore disclosed in conjunction with such a reel.

Heretofore, single action fly reels have been provided with drag mechanisms. Those reels imparted the same restriction to turning of the spool during retrieve as when the line was being stripped from the reel. Moreover, with such constructions the handle always turned with the spool so that when a fish having a long and strong initial run struck, the handle turned with the same brutal speed as the spool. To protect the knuckles as much as possible the control knob for adjusting the brake was generally placed on the opposite side of the reel from the handle. This, however, presents an awkward arrangement in that it requires either that the fisherman change hands to operate the control knob or reach over, or under, the reel to operate the knob with the opposite hand.

Other reel manufacturers, in an attempt to obviate the necessity of overcoming the resistance imparted to the spool by the brake during retrieve, supplied their fly reels with an adjustable drag means operative between the line spool and the handle. Here too, many manufacturers permitted the handle to rotate as line was being stripped from the spool. By this construction there was no built-in resistance for the fisherman to overcome while retrieving the line, but an anti-reverse pawl was required so that the drag would operate upon rotative rotation between the spool and the handle.

And, because an anti-reverse pawl is used, the fisherman is put to the task of overcoming the drag resistance every time he attempted to strip the line from the spool. He could, of course, reduce the drag setting every time before stripping off line for the cast and then attempt to reset it before playing the fly. This, at best, is a makeshift arrangement which tends to preclude effective presetting of the drag in balance with the rod, line, leader, tippet and fly being used.

Presetting of the desired drag is particularly important when fly fishing for those fish known for their spirited fight. For example, it is commonplace for the noteworthy salt water speedster the bone fish to make runs of 350 to 400 feet. When one considers the formidable load such a fish is dragging merely by way of the line and the preset drag it is readily apparent that something would break if he weren't permitted to run against a thoughtfully selected preset drag.

Summary of the invention

It is therefore an object of the present invention to provide a fly reel having a selectively operative drag and an alternatively operative brake means.

It is another object of the present invention to provide a fly reel, as above, having a drag means which is selectively adjustable to provide a predetermined resistance to rotation of the line spool.

It is yet another object of the present invention to provide a fly reel, as above, in which the drag means supplies a preselected resistance while said drag is selectively operative, removes all drag resistance when said drag is selectively inoperative and which will immediately reinstate the previously preselected resistance when the drag is made re-operative.

It is still another object of the present invention to provide a fly reel, as above, having an anti-reverse mechanism to prevent reverse rotation of the handle when said drag means is operative.

It is a further object of the present invention to provide a fly reel, as above, in which the brake means permits facile stripping of line from the reel during the cast without adversely affecting the fisherman's timing and yet prevents overrunning of the spool.

It is a still further object of the present invention to provide a fly reel, as above, in which the drag adjusting knob may be on the same side of the reel as the handle.

It is an even further object of the present invention to provide a fly reel, as above, in which the drag and alternative brake means are so compact that the hub diameter of the line spool need not encroach upon the storage capacity of the spool.

It is a yet further object of the present invention to provide a fly reel, as above, in which the line spool is easily removable from, and replaceable in, the housing of the reel.

These and other objects which will become apparent from the following specification are accomplished by means hereinafter described and claimed.

In general, a fly reel embodying the concept of the present invention has a housing with a line spool mounted for rotation therein. A crank means is provided for rotating the spool to retrieve the line, and a variable drag means is operative between the spool and crank means. Additionally, a brake means is operative between the spool and the housing, and a selecting means is provided for allowing selective alternate operation of the drag or brake means.

One preferred embodiment, together with alternative detail construction, is shown by way of example in the

Description of the preferred embodiment

Figures 1, 2:
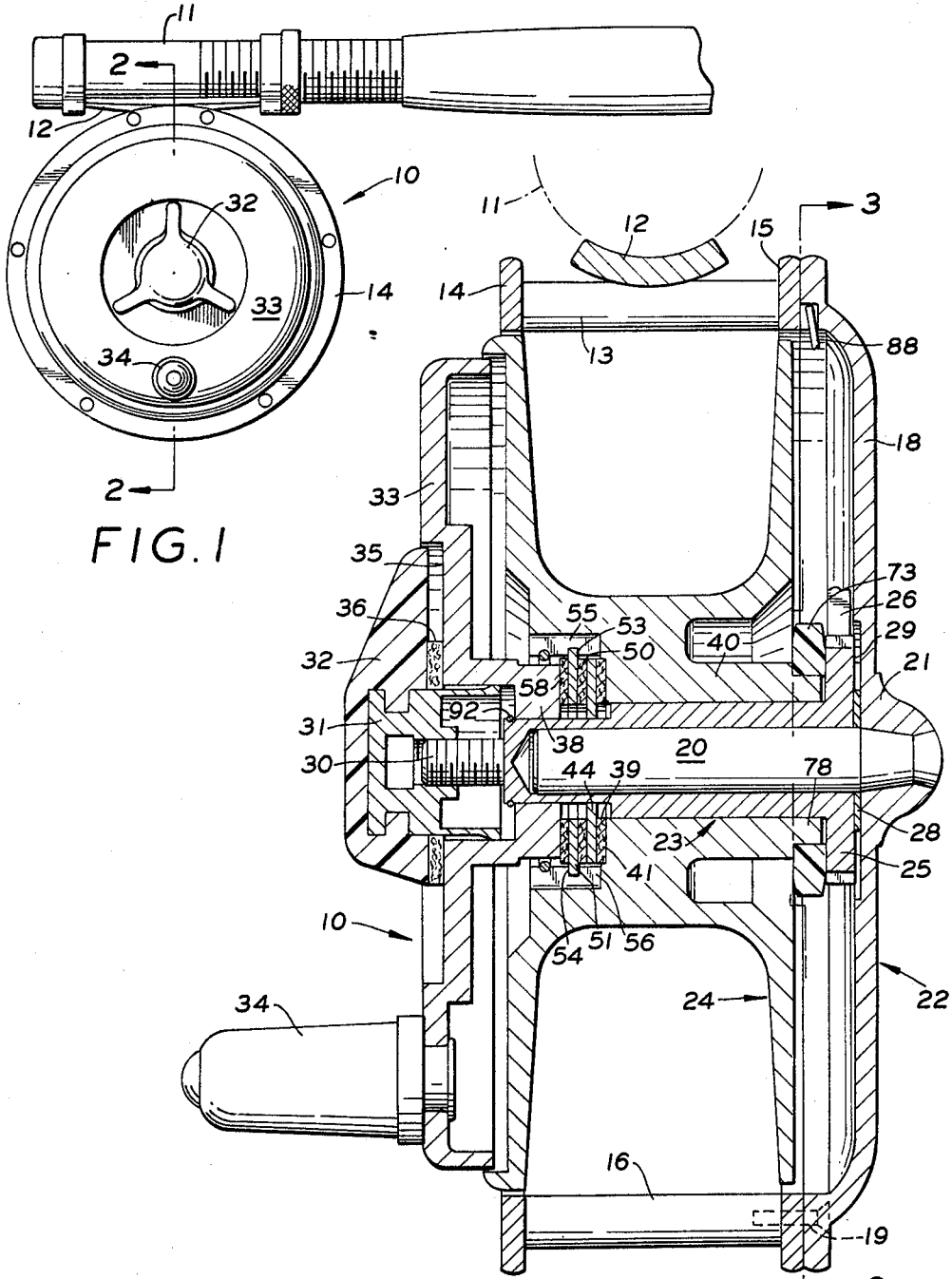
FIG. 1 is a side elevation of a fly reel embodying the concept of the present invention mounted on the reel seat of a conventional fly rod.
FIG. 2 is an enlarged vertical cross section taken substantially on line 2—2 of FIG. 1.

Referring more particularly to the drawings, a fly reel embodying the concept of the present invention is indicated generally by the numeral 10. The reel 10 is secured to the reel seat 11 of a fly rod by the foot 12 on crossplate 13 in the customary fashion.

Annular spacing rings 14 and 15, respectively, extend transversely outwardly from the cross plate 13 and are stabilized by peripherally spaced pillars 16 extending therebetween. As seen in FIG. 2, the annular rings 14 and 15 are positioned on the left and right, respectively. For convenience of description the ring 14 will designate the front of the reel 10 and ring 15 the back.

A back plate 18 is secured to the back ring 15, as by screws 19 which also secure the ring 15 to the crossplate 13 and to the pillars 16. The front ring 14 is similarly secured to the crossplate and pillars. A stub shaft which forms the axle 20 of the reel is nonrotatably affixed to, and extends perpendicularly outwardly from, the nave 21 of the back plate 18. This nave 21 is located in the central portion of the back plate 18 so that the axle 20 extends concentrically of the spacing rings 14 and 15. The general assemblage of the crossplate 13, spacing rings 14 and 15, pillars 16, backplate 18 and axle 20 forms the housing 22 of the reel 10.

A sleeve-like spool mount 23 is rotatably carried on axle 20, and the line spool 24 is, in turn, rotatably carried on the spool mount 23. That end of the sleeve-like spool mount 23 closest to the back plate 18 terminates in a radially extending ratchet 25 which, when engaged by pawl 26 permits rotation of the spool mount 23 in only one direction. An axle washer 28 is positioned between the back face 29 of the ratchet 25 and the nave 21 to minimize frictional wear therebetween.

The end of the spool mount 23 opposite the ratchet 25 presents a threaded spindle 30 on which is mounted a cap nut 31. A brake control knob 32 is fixed to the cap nut 31 so that manual rotation of the knob 32 rotates the nut 31.

Axially slidable along, but not rotatable with respect to, the spool mount 23 is a crank disc 33 to which the handle 34 is attached. The central, outer face 35 of disc 33 is engaged, through friction washer 36, by the brake knob 32. The innermost side of the crank disc 33 presents a pressure head 38 which facingly opposes the radial brake face 39 on the hub 40 of spool 24. A series of brake washers are positioned between the pressure head 38 and brake face 39 on the hub of spool 24 to provide selective drag resistance to that rotation of the spool 24 by which line is stripped therefrom—i.e., the direction opposite to which the pawl 26 permits the spool mount 23 to rotate.

A very suitable arrangement for the brake washers utilizes a friction washer 41, such as leather, one radial surface of which is positioned in juxtaposition against the radial brake face 39 on hub 40. The friction washer 41 has an annular central opening 42 and an annular peripheral surface 43 so that it may rotate with respect to both the spool mount 23 and the spool 24.

The radial surface of friction washer 41 opposite to that abutting brake face 39 is contacted by a compressing washer 44 which is slidable axially along but nonrotatable with respect to the spool mount 23, although it is rotatable with respect to the spool 24. Those skilled in the art could accomplish this by several constructions, the one depicted utilizing the provision of opposed, milled flats 45 and 46 on spool mount 23 engaged by a matingly flatted opening 48 through compressing washer 44. The periphery 49 of the compressing washer 44 is annular so that it is rotatable with respect to the spool 24.

A second friction washer 50 engages compressing washer 44 and is, in turn, engaged by a second compressing washer 51. The compressing washer 51 has an annular central opening 52 so that it is rotatable with respect to the spool mount 23, but is provided with radially extending lugs 53 and 54 which are received in corresponding axial slots 55 and 56, respectively, in the hub 40 of spool 24 so that the compressing washer 51 is axially slidable with respect to the spool 24 but nonrotatable with respect thereto.

A third friction washer 58 is positioned between the compressing washer 51 and the pressure head 38.

Figure 3:
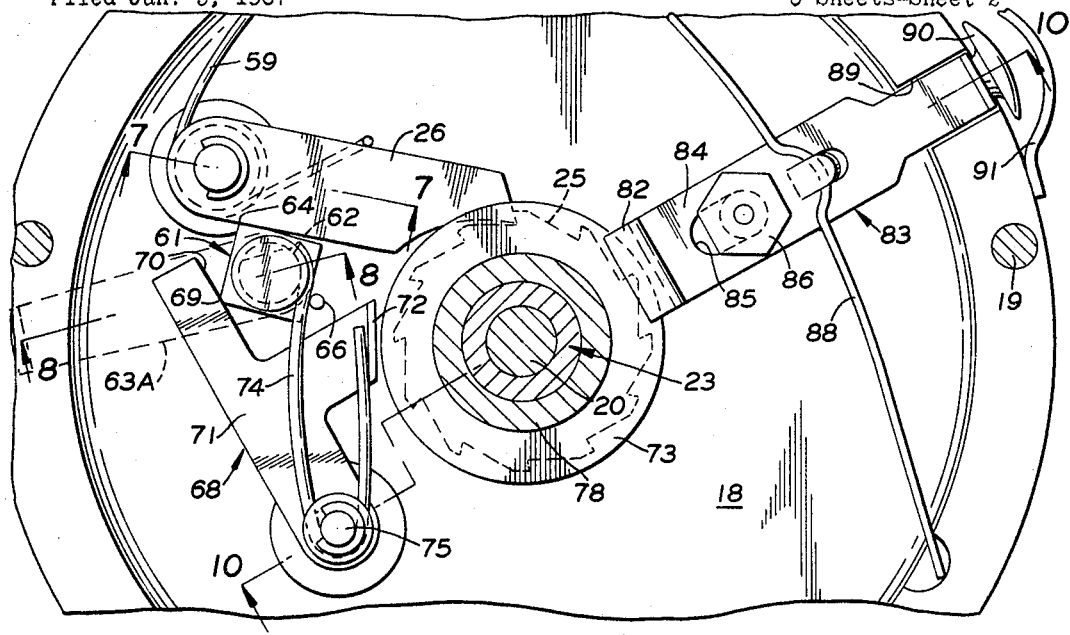
FIG. 3 is a further cross section taken substantially on line 3—3 of FIG. 2.
Figure 5:
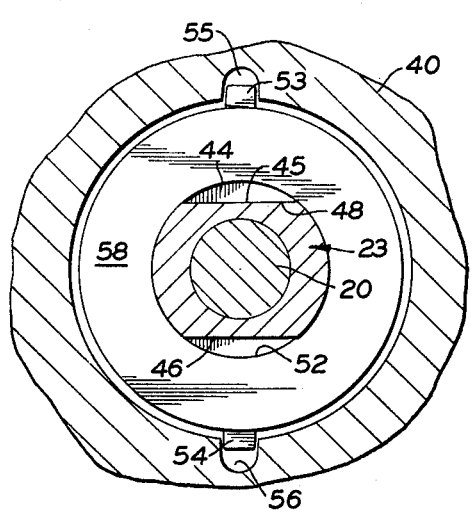
FIG. 5 is a cross section taken substantially on line 5—5 of FIG. 4.
Figure 4:
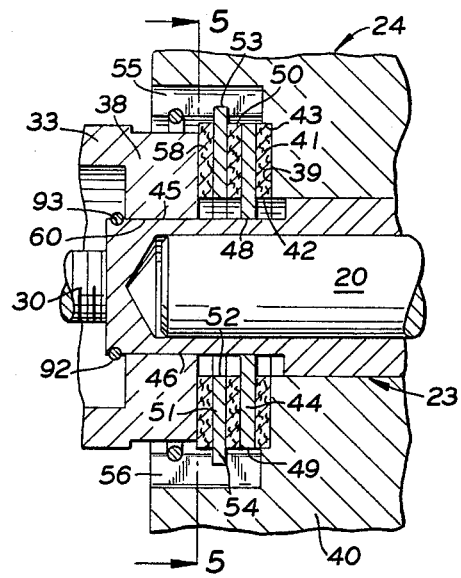
FIG. 4 is an enlarged area of FIG. 2 depicting the orientation of the drag washers.

The afore-described drag means permits selective variation of the drag desired to resist relative rotation between the spool 24 and the spool mount 23. The pawl 26 is biased, by spring 59, toward engagement with ratchet 25, as shown in FIG. 3. Inasmuch as the ratchet 25, through the engagement of the flats 45 and 46 on spool mount 23 with the mating aperture 60 through crank disc 33, is nonrotatable with respect to handle 34, the handle 34 can, when the pawl 26 engages ratchet 25, rotate the crank disc 33 and spool mount 23 in only one direction. As such, when the fisherman, in playing the fish, desires to let the fish run, and so permit line to be stripped from the spool 24, he may do so by manipulation of the drag knob 32 which varies the frictional resistance offered against rotation of the spool 24 relative to its mount 23. Turning the knob 32 so as to compress the washers 41, 44, 50, 51 and 58 between the pressure head 38 and the hub 40 of spool 24 increases the frictional resistance, or drag, offered against relative rotation, and counter-rotation of the knob 32 decreases the drag.

For many types of game fishing this drag is preset to allow rotation of the spool 24 with respect to its mount 23 at any time when a selected force is exerted against the line. By this arrangement tippets, or leaders, are not snapped and light hooks are not straightened when the fish suddenly, or unexpectedly, turns to run with the line, both of which result in lost fish.

Even through the drag means is preset to protect the weakest link in the chain of line, leader and lure, this drag may, nevertheless, offer too great a resistance to the fisherman as he strips line from the reel preparatory to and during, the cast. It is for this reason that the subject reel 10 has a pawl release cam 61 by which the pawl 26 may be swung out of engagement with the ratchet 25.

The pawl release cam 61 is carried on a cam shaft 62 which extends through the back plate 18 and supports a selecting lever 63 on the exterior of the reel 10. With the selecting lever 63 in the position 63A depicted in FIG. 3 the cam 61 does not engage pawl 26 and it is spring-biased into engagement with ratchet 25. An approximately 45° rotation of the selecting lever 63 to position 63B depicted in FIG. 6 brings the apex 64 of cam 61 against the cam follower surface 65 on pawl 26 to retract the pawl 26 from ratchet 25. With the apex 64 in the over-center position depicted in FIG. 6 the biasing action of spring 59 also locks the pawl 26 in retracted position, the cam being restrained against further rotation by stop pin 66.

As long as the pawl 26 is in the retracted position the drag means is ineffectual since the spool 24 and spool mount 23 can now rotate as a unit on axle 20. In this condition the fisherman could strip line with no resistance being offered by the spool. Having no drag, however, is as equally undesirable as having too much drag. Too much drag to overcome is ruinous to the critical timing of the back cast-pause-forward case sequence incident to fly fishing, and no drag permits the spool 24 to overrun as the fisherman strips off his line for the cast. Overrun is the term given to that rotation of the spool beyond that required for the amount of line removed. The result is the fisherman's anathema—the backlash.

Figure 6:
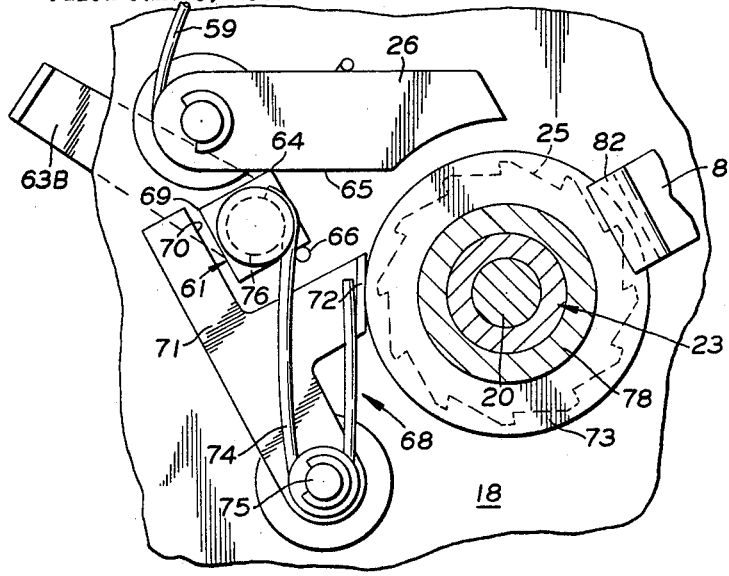
FIG. 6 is the partial area of a cross section similar to FIG. 3 with the parts depicted in a position where the brake means rather than the drag means is effective.

In the subject reel 10 a brake 68 is provided which is independent of the drag and which becomes operative when the drag is released by retraction of pawl 26. As shown in FIGURES 3 and 6, the cam 61 has the shape of a right-angled parallelogram—the particular cam depicted being a square. A secondary apex 69 contacts a cam follower 70 on brake arm 71 to hold the shoe 72 away from the friction brake disc 73 carried on spool 24 and its mount 23 when the pawl 26 is in engagement with the ratchet 25. However, when the selecting lever 63 is rotated so that apex 64 of cam 61 engages the follower 65 to retract pawl 26, the secondary apex 69 is rotated away from the follower 70 and the biasing spring 74 forces the foot 72 into engagement with the friction disc 73 as the brake arm 71 pivots about the mounting stud 75 carried on back plate 18.

The spring 74 is selected to be of such strength that the spool 24 and mount 23 rotating together will not overrun as a result of the fisherman stripping line from the spool for the cast and at the same time not offer sufficient resistance that the angler's timing will be affected as he strips line from the reel during the actual casting procedure. It is also the pressure that spring 74 exerts against anchor notch 76 in cam 61 that holds the aper 69 from rotating away from follower 70; the stop pin 66 also preventing the apex 69 from being rotated past follower 70.

Figure 9:
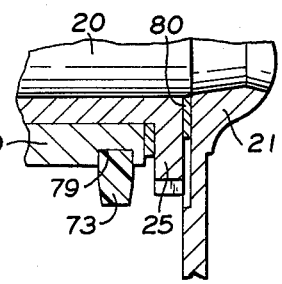
FIG. 9 is a partial area of a cross section similar to FIG. 2 depicting an alternative detail construction by which the brake washer may be mounted on the line spool; and, FIG. 10 is a cross section taken substantially on line 10—10 of FIG. 3.
Figure 7:
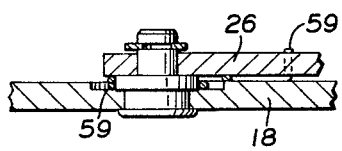
FIG. 7 is a cross section taken substantially on line 7—7 of FIG. 3.
Figure 8:
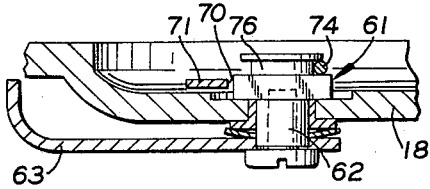
FIG. 8 is a cross section taken substantially on line 8—8 of FIG. 3.
Figure 10:
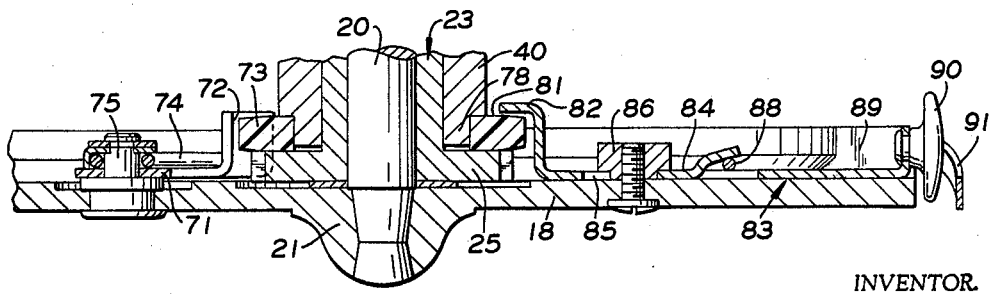

As shown in FIGS. 2 and 10 the disc 73 may be secured on a shoulder 78 in the hub 40 of spool 24 so as to be clamped between the hub 40 and the ratchet 25. As such, the disc also serves to space the hub 40 somewhat apart from ratchet 25 and thereby prevent galling on relative rotation therebetween. In this position, too, the disc also serves as an additional frictional washer in the drag means. However, the disc 73 may also be received in a notch 79 in the hub 40 (FIG. 9) in which case an additional washer 80 would be interpositioned between ratchet 25 and hub 40.

In either event the radial extent of the disc 73 beyond the hub 40 serves as a keeper 81 for engagement by the head 82 of lock bolt 83. The body portion 84 of the lock bolt 83 is slidably received against the backplate 18 with the head 82 being laterally offset therefrom to engage the keeper 81 and thereby retain the spool 24 and mount 23 within the housing 22. The body portion 84 is longitudinally slotted, at 85, to engage a slide guide 86 mounted on the backplate 18 which permits reciprocal movement of the lock bolt, and a wire spring 88 biases the bolt 83 continuously inwardly to the latched position.

The lock bolt 83 extends radially outwardly through an aperture 89 in the backplate 18 and carries a button 90 exteriorly of the reel 10 which may be hand operated against the biasing action of spring 88 to disengage the head 82 from the keeper 81 when it is desired to remove the spool 24 and spool mount 23 from the reel 10.

A guard 91 is secured to the reel to protect the button 90 from inadvertent manipulation.

With the lock bolt 83 moved to the unlatched position the head 72 is retracted from keeper 81 and the spool 24 and spool mount 23, together with the crank disc 33 and associated drag washers, can be easily extracted from the housing 22 by sliding them axially of axle 20. And, the spool 24 itself may also be separated from the extracted assembly.

To remove the spool the control knob 32 is turned until the nut 31 becomes unscrewed from spindle 30. The retaining clip 92 may then be removed from its receiving notch 93 in the spool mount 23, and the crank disc 33 together with the drag washers 41, 44, 50, 51 and 58 may thereafter be axially translated from the spool mount 23 to allow removal of the spool 24 itself. In this way the angler may easily replace spools and thereby change lines to suit the particular fishing conditions encountered.

It should now be apparent that a fly reel embodying the concept of the present invention has selectively and alternately effective drag and brake means and otherwise accomplishes the objects of the invention.

What is claimed is:

1. A fly reel comprising, a housing with axle, a spool mount rotatably received on said axle, a line spool carried on said spool mount and mounted for rotation with and with respect thereto, crank means for rotating said spool mount, drag means operatively connecting said line spool with said spool mount, brake means operatively connecting said line spool to said housing to retard rotation of said line spool with respect thereto, and selecting means for alternately effecting operation of said drag and brake means.

2. A fly reel, as set forth in claim 1, in which the brake means comprises a friction disc rotatable with said line spool and spool mount and a brake shoe carried on said housing.

3. A fly reel, as set forth in claim 1, in which an anti-reverse pawl permits rotation of said spool mount only in one direction.

4. A fly reel, as set forth in claim 3, in which the selecting means comprises a cam means for controlling movement of said anti-reverse pawl into and out of engagement with said spool mount.

5. A fly reel, as set forth in claim 4, in which the brake means comprises a friction disc rotatable with said line spool and spool mount and a brake shoe carried on said housing.

6. A fly reel, as set forth in claim 5, in which the selecting means comprises a cam means which not only controls the movement of said anti-reverse pawl into and out of engagement with said spool mount but also the alternate engagement of said brake shoe with the friction disc rotatable with said line spool and spool mount.

7. A fly reel, as set forth in claim 1, in which the line spool has a hub and the crank means comprises a crank disc carried on said spool mount for rotational movement therewith and axial movement with respect thereto, handle means for rotating said crank disc, a pressure head on said crank disc opposingly facing the hub of said line spool, drag washers interposed between said pressure head and said hub, and knob means to move said pressure head axially toward and away from said hub to vary the frictional resistance opposing rotation of said line spool with respect to said spool mount.

8. A fly reel, as set forth in claim 7, in which an anti-reverse pawl permits rotation of said spool mount in only one direction and said selecting means comprises a cam means for controlling movement of said anti-reverse pawl into and out of engagement with said spool mount.

9. A fly reel, as set forth in claim 8, in which the brake means comprises a brake disc carried on said line spool and a brake shoe carried on said housing.

10. A fly reel, as set forth in claim 9, in which the brake shoe is carried on a pivotal brake arm and in which the cam means moves said brake shoe out of engagement with said brake disc when said anti-reverse pawl is in engagemnet with said spool mount and moves said anti-reverse pawl out of engagement with said spool mount and moves said anti-reverse pawl out of engagement with said spool mount when said brake shoe is in engagement with said brake disc.

11. A fly reel, as set forth in claim 10, in which the anti-reverse pawl is biased continually toward said spool mount and the brake shoe is continuously biased toward said brake disc.

12. A fly reel, as set forth in claim 11, in which the brake disc is a washer which extends radially outwardly from the hub of said line spool to present a keeper, and a lock bolt is slidably mounted in said housing between a latched and unlatched position, said lock bolt having a head which engages said keeper when said lock bolt is in the latched position to maintain said reel assembled and which disengages from said keeper when said lock bolt is in the unlatched position to permit disassembly of said reel.

13. A fly reel, as set forth in claim 12, in which a spring means continuously biases said lock bolt toward said latched position.

References Cited

UNITED STATES PATENTS

| | | | |
|---|---|---|---|
| 2,059,765 | 11/1936 | Adams | 242—84.5 XR |
| 2,648,506 | 8/1953 | Kirby | 242—84.45 |
| 3,239,162 | 3/1966 | Henze | 242—84.45 |
| 3,268,182 | 8/1966 | Clark | 242—84.44 |

BILLY S. TAYLOR, Primary Examiner